United States Patent

Knauer et al.

[15] 3,649,746

[45] Mar. 14, 1972

[54] HUE EXPANDER CIRCUIT PREFERENCE CONTROL

[72] Inventors: Paul E. Knauer; John M. Kresock, both of Fort Wayne, Ind.

[73] Assignee: The Magnavox Company, Fort Wayne, Ind.

[22] Filed: May 1, 1970

[21] Appl. No.: 33,708

Related U.S. Application Data

[63] Continuation-in-part of Ser. No. 823,781, May 12, 1969, which is a continuation-in-part of Ser. No. 863,236, Oct. 2, 1969, which is a continuation-in-part of Ser. No. 859,942, Sept. 22, 1969.

[52] U.S. Cl. ..............178/5.4 HE, 178/5.4 MC, 178/5.4 SD, 328/133

[51] Int. Cl. ..........................................................H04n 9/12

[58] Field of Search...........178/5.4 HE, 5.4 R, 5.2 A, 5.4 SD, 178/5.4 MC; 328/133

[56] References Cited

UNITED STATES PATENTS

| | | | |
|---|---|---|---|
| 3,301,945 | 1/1967 | Dietch | 178/5.4 |
| 2,918,523 | 12/1959 | Shapiro | 178/5.2 |
| 3,456,068 | 7/1969 | Wilhelmy | 178/5.4 |
| 3,483,316 | 12/1969 | Hickok | 178/5.4 |
| 3,315,170 | 4/1967 | Baker | 178/5.4 |

*Primary Examiner*—Richard Murray
*Assistant Examiner*—Peter M. Pecort
*Attorney*—Pendleton, Neuman, Williams & Anderson

[57] ABSTRACT

Preference controls for use with color television receiver flesh expander circuits are described in which a viewer control is provided for adjusting the phase of the reference signal used to trigger the flesh detection circuits allowing the viewer to easily alter the hue of flesh colors produced on the picture tube face to suit his preference.

10 Claims, 3 Drawing Figures

INVENTORS
Paul E. Knauer
John M. Kresock
by Pendleton, Neuman, Williams & Anderson
Attys

HUE EXPANDER CIRCUIT PREFERENCE CONTROL

CROSS REFERENCE TO RELATED APPLICATIONS

This application is a continuation-in-part of an application originally filed by Paul E. Knauer and Paul J. Whiteneir, Jr. on May 12, 1969, entitled METHOD AND APPARATUS FOR MODIFYING ELECTRICAL SIGNALS, Ser. No. 823,781. An application of Paul J. Whiteneir, Jr. filed on Oct. 2, 1969, entitled HUE EXPANDER CIRCUITS, Ser. No. 863,236, which is also a continuation-in-part of the aforementioned application, and an application of Paul E. Knauer and Paul J. Whiteneir filed on Sept. 22, 1969, also entitled METHOD AND APPARATUS FOR MODIFYING ELECTRICAL SIGNALS, Ser. No. 859,942, contain subject matter relating to this application.

BACKGROUND OF THE INVENTION

This invention relates to electrical circuits for processing information and, more particularly, to color television hue modification circuits and, still more particularly, to circuits for conveniently varying the hue of flesh colors produced by color television systems having flesh expander circuits.

In the above-mentioned three copending applications there are disclosed a plurality of circuits for modifying a received chrominance signal in a desired manner which are particularly useful with color television apparatus using the N.T.S.C. color transmission system. In the application of Knauer and Whiteneir, Ser. No. 859,942, the phase of the reference signal used to demodulate the chrominance signal is adjusted to that phase at which the demodulated chrominance signal exhibits a desired property so that flesh tones will be correctly reproduced. In the application of Knauer and Whiteneir, Ser. No. 823,781, a plurality of hue or flesh expander circuits are disclosed. Those latter circuits, basically, detect when the phase of the received chrominance signal is within a predetermined phasic range and, thus, when it represents a hue within a predetermined colorimetric range. When the chrominance signal is within that range, the circuit then modifies its phase toward a preset phase representative of a critical hue. Normally the critical hue is that of flesh and the predetermined colorimetric range is centered on flesh hue. The effect on the reproduced picture is, then, to shift all colors in the vicinity of flesh hue toward a preset flesh hue.

It has been found desirable to include within such flesh hue correction circuits means allowing individual viewers to adjust the hue or tint of flesh tones. Particularly, in circuits of the hue or flesh expander type, it is desirable to include circuit means for allowing the viewer to conveniently adjust the flesh hue toward which other colors in its vicinity will be shifted. Such means yield at least two desirable results. First, they allow viewers to adjust the preset flesh hue to suit their own individual preferences. Second, they increase the tolerances allowable on the components used in the hue expander circuits as relatively large deviations in the circuit output from the design normal may be compensated for by adjustment of the preference control.

SUMMARY OF THE INVENTION

This invention relates to electrical information processing circuits which alter the informational value of received signals in a desired manner and provides methods and apparatus for adjusting the nature of that alteration. Specifically, this invention provides methods and apparatus for use in color television chrominance signal modification circuits to vary the nature of the modification in accord with individual viewer preference. More specifically, this invention provides methods and apparatus for use in color television hue expander circuits for altering the critical hue toward which colors near that hue are shifted.

It is thus an object of this invention to provide methods and apparatus for adjusting the value of the critical output in information processing electrical circuits which expand the range of received signals producing the critical output.

It is an object of this invention to provide methods and apparatus for use in chrominance signal modification circuits to vary the induced modification in accord with viewer preferences.

It is an object of this invention to provide methods and apparatus useful with color television hue expander circuits for varying the hue of the critical output.

It is an object of this invention to provide methods and apparatus for varying the critical flesh hue in television flesh expander circuits.

It is an object of this invention to provide a viewer-operated preference control in color television receiver flesh expander circuits.

It is an object of this invention to provide circuitry fulfilling all the above-named objects which is further characterized by simplicity of design, economy of construction, and reliability and ease of operation.

Further and additional objects will appear from the following specification, appended claims and accompanying drawing.

DESCRIPTION OF THE PREFERRED EMBODIMENT

In the subsequent description, this invention will be described in relation to preference controls for use in conventional, American, compatible color television receivers using the N.T.S.C. color transmission system. It will be obvious to those skilled in the art that the disclosed circuitry can be adapted both to other types of color television transmission systems, to systems for transmitting other types of information, and to chrominance signal modification circuits of types other than that here discussed.

Figure 1:
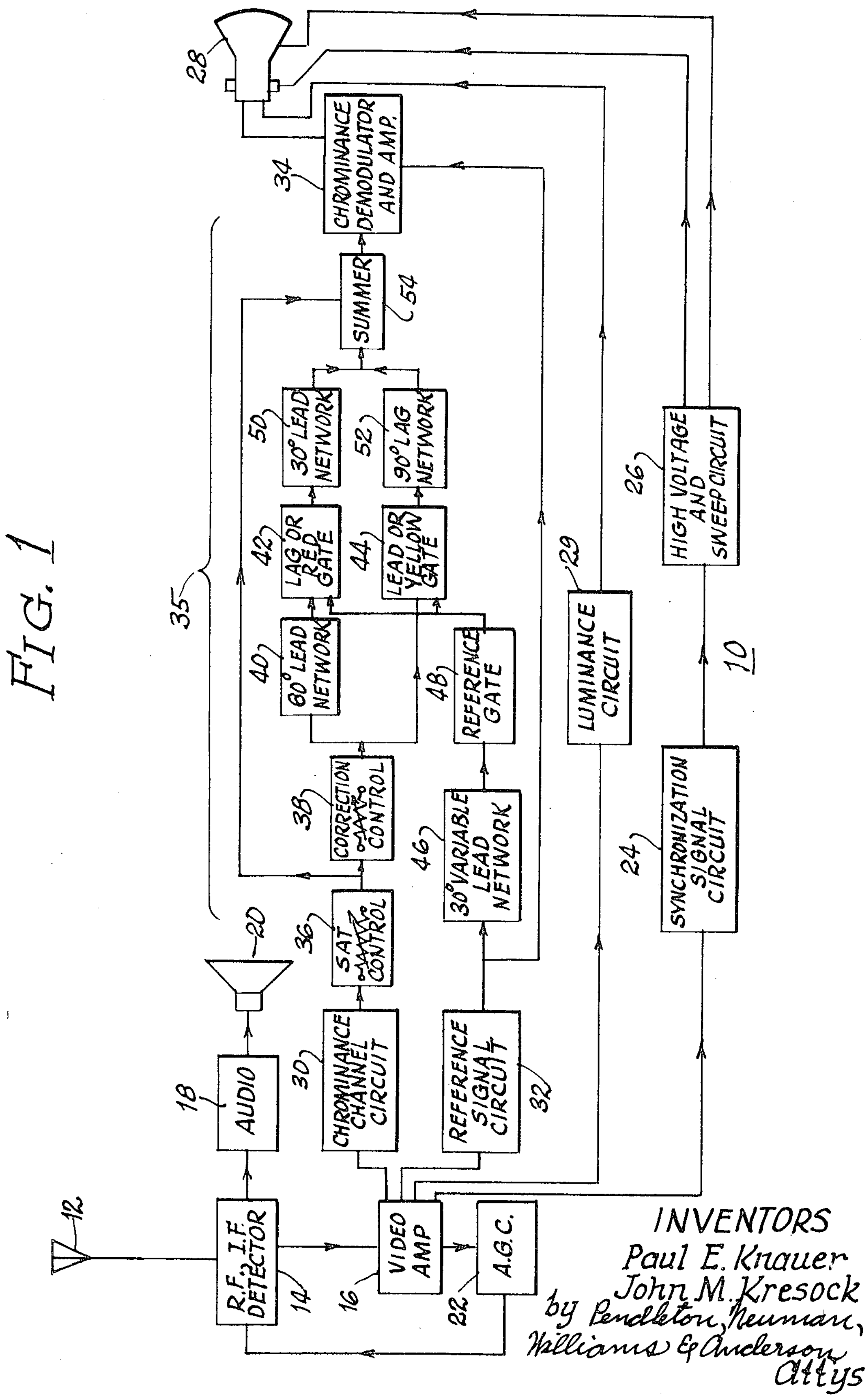
FIG. 1 is a block diagram of a television receiver having a hue expander circuit incorporating one embodiment of this invention.

A color television receiver 10 for use with the N.T.S.C. color television transmission system and having a hue expander circuit incorporating one embodiment of the preference control of the present invention is disclosed in FIG. 1. The overall operation of the receiver shown is conventional and will be briefly described. The hue expander circuit and preference control of this invention will then be described in greater detail.

An antenna 12 is connected to the input of a stage 14 which amplifies the received composite color television radiofrequency signal, converts it to an intermediate frequency signal, amplifies that intermediate frequency signal, and then detects the amplitude-modulated waveform of the intermediate frequency signal to recover the video signal. That video signal is applied to and amplified by a video amplifier stage 16. A second output from stage 14 is applied to audio stage 18 which detects and amplifies the frequency modulations in the intermediate frequency signal to recover the intercarrier sound signal and applies that sound signal to a sound reproducer or speaker 20. A first output from video amplifier 16 is applied to an automatic gain control circuit 22 which is, in turn, coupled to stage 14 for varying the gain of that stage to compensate for variations in amplitude of the received signal. A second output from video amplifier 16 is applied, in turn, to a synchronization signal circuit 24, which recovers the synchronization information from the received video signal, and a high voltage and sweep circuit 26 which develops the required deflection signals and high voltages and applies them to a deflection yoke on and an accelerating electrode in a picture tube 28, respectively. A third output from video amplifier 16 is applied to a luminance circuit 29 which applies the required luminance signal to the electron guns of picture tube 28. Outputs from video amplifier 16 are additionally connected to a chrominance channel circuit 30 and a reference signal circuit 32. The output from reference signal circuit 32 is coupled to a chrominance demodulator and amplifier 34. The chrominance signal output of demodulator 34 is applied to the electron gun structure in picture tube 28.

Chrominance channel circuit 30 delivers at its output the modulated chrominance signal; its output is normally taken from the bandpass amplifier. Reference signal circuit 32 develops a 3.58 MHertz sine wave reference signal nominally at I phase with respect to the phase of the color burst signal. The outputs of chrominance channel circuit 30 and reference signal circuit 32 are then applied to inputs of a hue expander circuit 35 and thence to an input of the chrominance demodulator and amplifier 34. The hue expander circuit detects when the chrominance signal phase is within a predetermined range, preferably centered about the I or reference signal phase, and then adds appropriate quadrature correction vectors which alter the chrominance signal phase toward a preset phase at the center of that predetermined range and representative of a critical hue which it is desired to be correctly reproduced, preferably the reference or I phase representative of flesh hue. Thus in the preferred case when the hue of the received signal is in the vicinity of flesh, it is automatically shifted toward flesh by the hue expander circuit 35.

Turning now to the hue expander circuit 35, the chrominance signal from the output of chrominance channel circuit 30 is applied seriatim to a saturation control 36 and a correction control 38. The controls merely comprise signal varying means for conveniently varying the levels of their respective output signals. The output of correction control 38 is applied to an input of a 60° lead network 40 having an output signal which leads its input signal by approximately 60° at 3.58 MHertz. The output of network 40 is applied to a first input of a lag or red gate 42. The output of correction control 38 is also applied directly to a first input of a lead or yellow gate 44.

The I-phase reference signal from reference signal circuit 32 is coupled through a 30° variable lead network 46 to an input of a reference gate 48 such that the signal applied to the reference gate is advanced in phase approximately 30° from I phase, henceforth referred to as the reference phase. Variable lead network 46 includes circuitry whereby the viewer may conveniently alter the phase shift introduced by that network, and thus the hue of the reproduced flesh tones, in accord with the principles of this invention. The output of reference gate 48 is connected to second inputs of both lag or red gate 42 and lead or yellow gate 44. Reference gate 48 develops a generally rectangular wave output signal over a predetermined phasic portion of the 3.58 MHertz sine wave signal applied to it from lead network 46. Lag or red gate 42 and lead or yellow gate 44 then both use that output signal to detect the presence of components in the chrominance signal delivered to them having a phase in the vicinity of the reference phase. Since the reference phase leads I phase by approximately 30° in accord with the adjustment of variable lead network 46 and the chrominance signal is applied to gate 44 unaltered in phase, that gate detects the presence of components in the chrominance signal leading I phase by approximately 30°, i.e., components representing yellow hues. The chrominance signal applied to gate 42 is, however, advanced in phase by approximately 60° over its unaltered state. Gate 42 therefore detects the presence of components in the chrominance signal lagging I phase by approximately 30°, i.e., components representing red hues.

Lag and lead gates 42 and 44, then, produce at their outputs 3.58 MHertz signals at approximately the reference phase and at a magnitude proportional to the amplitude of the red or yellow components in the received chrominance signal. They may be conveniently visualized as chrominance demodulators, red gate 42 demodulating the chrominance signal along a red axis and yellow gate 44 demodulating the chrominance signal along a yellow axis. The 60° lead network 40 permits both demodulators to be triggered with the same reference signal. The output of lag or red gate 42 is applied to a 30° lead network 50 producing at its output a 3.58 MHertz sine wave approximately 30° advanced in phase from the output of gate 42. The total phase shift through 60° lead network 40 and 30° lead network 50 is thus approximately 90°. The output of 30° lead network 50 is thus a 3.58 MHertz sine wave phase advanced approximately in quadrature with the red components of the chrominance signal. The output of lead or yellow gate 44 is applied to a 90° lag network 52 producing at its output a 3.58 MHertz sine wave retarded in phase from the output of gate 44 by approximately 90°. The output of 90° lag network 52 is thus a 3.58 MHertz sine wave phase retarded in approximate quadrature with the yellow components of the chrominance signal.

The outputs of saturation control 36, lead network 50 and lag network 52 are all applied to inputs of a summer 54 which adds them together, perhaps with some adjustment in their relative magnitudes, and isolates the chrominance channel circuit from the output of the hue expander. The quadrature signals thus add to the chrominance signals and tend to shift those chrominance signals representative of red or yellow hues toward flesh. Correction control 38 may be used to vary the magnitude of the quadrature signals.

Figures 2, 3:
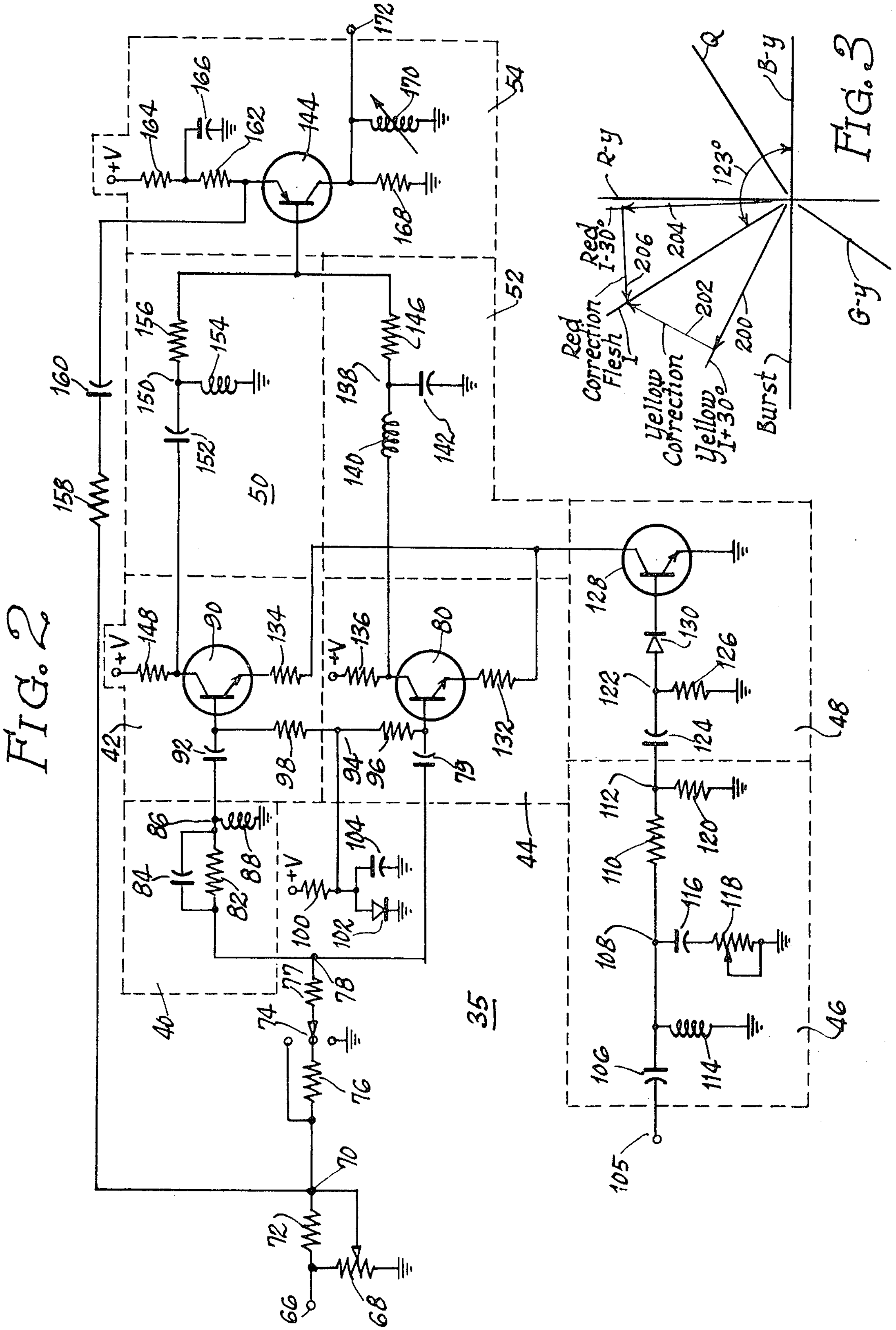
FIG. 2 is a schematic diagram of a hue expander circuit of FIG. 1.
FIG. 3 is an N.T.S.C. chromaticity diagram for aid in understanding this invention.

FIG. 2 is a schematic diagram of a hue expander circuit 35 of FIG. 1. The received chrominance signal is applied to an input terminal 66 which is connected both to ground through the resistive element of a saturation control potentiometer 68 and to a circuit point 70 through a resistor 72. The wiper arm of potentiometer 68 is connected to circuit point 70. A first contact of a single-pole triple-throw correction control switch 74 is directly connected to the circuit point 70, a second contact is coupled to circuit point 70 through a resistor 76, and a third contact is connected to ground. The movable contact of correction control switch 74 is coupled through a resistor 77 to circuit point 78 which is, in turn, coupled through a blocking capacitor 79 to the base of an NPN lead gate transistor 80 and through the parallel combination of a resistor 82 and a capacitor 84 to a circuit point 86. Circuit point 86 is coupled to ground through an inductor 88 and to the base of an NPN lag gate transistor 90 through a blocking capacitor 92. The combination of resistor 82, capacitor 84, and inductor 88 forms a 60° phase shifting network. The bases of transistors 80 and 90 are coupled to a circuit point 94 through resistors 96 and 98, respectively, which is, in turn, coupled both to a source of positive voltage V through a dropping resistor 100 and to ground through the parallel combination of a diode 102 and a filter capacitor 104. Diode 102 is oriented so that its direction of high positive conductivity is toward ground. A voltage is developed at circuit point 94 so that, in the quiescent state, transistors 80 and 90 are biased at their point of conduction onset.

In certain applications of this invention it has been found convenient to use a reference signal circuit 32 supplying a signal at R-Y phase rather than at I phase as discussed above in relation to FIG. 1. The nominal phase lead of variable lead network 46 is then 63° rather than 30°. Accordingly, a continuous wave 3.58 MHertz reference signal at R-Y phase is applied to an input terminal 105 which is coupled through a capacitor 106 to a terminal point 108 and, in turn, through a resistor 110 to a terminal point 112. Terminal point 108 is coupled to ground both through an inductor 114 and through the series combination of a capacitor 116 and the resistive element of a phase adjusting potentiometer 118. The wiper arm of potentiometer 118 is also connected to ground. Circuit point 112 is coupled to ground through a resistor 120. The total phase shift between input terminal 105 and circuit point 112 is approximately 63° leading, but this may be varied by adjusting potentiometer 118. Potentiometer 118 may be physically located on the television receiver cabinet so that it is readily accessible to the viewer. In accord with this invention, adjustment of potentiometer 118 adjusts the hue of the reproduced flesh colors.

Circuit point 112 in the variable lead network is coupled to a circuit point 122 in reference gate 48 through a capacitor 124. Circuit point 122 is coupled to ground through a resistor 126 and to the base of an NPN reference gate transistor 128 through a diode 130, the diode being oriented so that its direction of high positive conductivity is toward the base of transistor 128, thus protecting the transistor 128 from reverse voltages. Diode 130 also aids in shaping and controlling the width of the collector current pulses of transistor 128.

The emitter of transistor 128 is connected to ground while the collector is coupled to the emitters of transistors 80 and 90 through resistors 132 and 134, respectively. Transistor 128 conducts during only a small phasic portion of the applied reference signal, here approximately 30° centered about the reference signal positive peak. The collector of transistor 80 is coupled to a source of positive voltage V through a resistor 136 and to a circuit point 138 through an inductor 140; circuit point 138 is coupled both to ground through a capacitor 142 and to the base of a PNP summer transistor 144 through a resistor 146. The collector of transistor 90 is coupled to a source of positive voltage V through a resistor 148 and to a circuit point 150 through a capacitor 152; circuit point 150 is coupled both to ground through an inductor 154 and to the base of transistor 144 through a resistor 156.

The phase lag between the collector of transistor 80 and the base of transistor 144 is approximately 90°, while the phase lead between the collector of transistor 90 and the base of transistor 144 is approximately 30°. Circuit point 70 is coupled through the series combination of resistor 158 and capacitor 160 to the emitter of transistor 144. The emitter of transistor 144 is coupled to a source of positive voltage V through the series combination of resistors 162 and 164; the junction of those two resistors is coupled through a capacitor 166 to ground. The collector of transistor 144 is coupled to ground through the parallel combination of resistor 168 and variable inductor 170 and to an output terminal 172. Output terminal 172 is then connected to the input of chrominance demodulator and amplifier 34. Inductor 170 is tuned together with its stray capacitance to approximately 3.58 MHertz.

In one application of the embodiment of FIG. 2, the components used had the following values:

| | |
|---|---|
| Resistor 68 | 500 ohms |
| Resistor 72 | 390 ohms |
| Resistor 76 | 560 ohms |
| Resistor 77 | 560 ohms |
| Capacitor 79 | 0.01 microfarads |
| Resistor 82 | 2.2 kilohms |
| Capacitor 84 | 43 picofarads |
| Inductor 88 | 27 microhenries |
| Capacitor 92 | 0.01 microfarads |
| Resistor 96 | 2.2 kilohms |
| Resistor 98 | 2.2 kilohms |
| Resistor 100 | 10 kilohms |
| Capacitor 104 | 0.01 microfarads |
| Capacitor 106 | 47 picofarads |
| Resistor 110 | 330 ohms |
| Inductor 114 | 6.8 microhenries |
| Capacitor 116 | 150 picofarads |
| Potentiometer 118 | 6 kilohms |
| Resistor 120 | 820 ohms |
| Capacitor 124 | 0.01 microfarads |
| Resistor 126 | 8.2 kilohms |
| Resistor 132 | 220 ohms |
| Resistor 134 | 270 ohms |
| Resistor 136 | 1 kilohm |
| Inductor 140 | 56 microhenries |
| Capacitor 142 | 20 picofarads |
| Resistor 146 | 4.7 kilohms |
| Resistor 148 | 1 kilohm |
| Capacitor 152 | 20 picofarads |
| Inductor 154 | 120 microhenries |
| Resistor 156 | 4.7 kilohms |
| Resistor 158 | 330 ohms |
| Capacitor 160 | 0.01 microfarads |
| Resistor 162 | 330 ohms |
| Resistor 164 | 680 ohms |
| Capacitor 166 | 0.01 microfarads |
| Resistor 168 | 1.5 kilohms |
| Inductor 170 | 12–35 microhenries |

The transistor types used were:

| | |
|---|---|
| Transistor 80 | SE5025 |
| Transistor 90 | SE5025 |
| Transistor 128 | 2N5134 |
| Transistor 144 | 2N4916 |

The positive voltage source V used was 20 volts and this developed an 0.6-volt bias at circuit point 94. In the embodiment of FIG. 2, the red and yellow gates 42 and 44 phase invert the applied chrominance signals and summer 54 reinverts the applied correction signals so that they are added to the chrominance signal in correct phase.

FIG. 3 is a conventional N.T.S.C. chromaticity diagram for aid in explanation of the operation of the circuit of FIG. 2. In that diagram the chrominance of any color may be represented by specifying its phase or angular displacement with respect to a reference axis, in this case the B-Y axis, and its magnitude. The phase and magnitude correspond to the hue and saturation, respectively, of the color. As is conventional, the I or flesh axis leads the B-Y axis by 123°. Chrominance signals representative of red or yellow hues lie along the R or Y axes shown lagging or leading the flesh axis by 30°, respectively. If a chrominance signal represented by vector 200 in FIG. 3 and lying on the yellow axis is applied to input terminal 66 of the flesh expander circuit, yellow gate 44 will effectively cause to be produced at the output terminal 172 a quadrature correction signal as represented by vector 202 in FIG. 3. Similarly, if a chrominance signal as represented by vector 204 and lying on the red axis is applied to input terminal 66, red gate 42 will effectively cause to be produced at the output terminal 172 a quadrature correction signal as represented by vector 206 in FIG. 3. In each case it will be seen that the correction signal adds to the original chrominance signal shifting it in phase toward an axis midway between the red and yellow axes at flesh or I phase.

The red and yellow gates 42 and 44 will, however, produce outputs when the phase of the applied chrominance signal is removed from flesh or I phase by other than thirty degrees. The red gate 42 shown in FIG. 2 will, for example, produce an output correction signal when the chrominance signal is within plus or minus 90° of the red axis, while yellow gate 44 will produce an output correction signal when the chrominance signal is within plus or minus 90° of the yellow axis. The phases of the individual correction signals will always be approximately 90° removed from their respective gate axes and their amplitudes will diminish as the chrominance signal phase moves away from the red or yellow axis phase. For chrominance signals so phased as to produce a correction signal from both the red and yellow gates, the net correction signal applied to it will be the sum of two correction signals, one from each gate. For example, if an I phase chrominance signal is applied to input terminal 66, correction signals of equal magnitude and approximately 180° out of phase will be added to it resulting in essentially no change in the chrominance signal phase.

As will be apparent, lead network 46 determines the phase of the reference signal applied from reference gate 48 to red and yellow gates 42 and 44. In accord with this invention, lead network 46 includes variable circuit means, in this case potentiometer 118, for conveniently varying the phase of the signal at the output of lead network 46, and thus the phase of the reference signal. Changing the adjustment of potentiometer 118 thus changes the axes about which red and yellow gates 42 and 44 detect. In particular, adjustment of potentiometer 118 directly varies the phase of the reference signal applied to red and yellow gates 42 and 44. Yellow gate 44 will demodulate or detect chrominance signals at the phase of the reference signal. Red gate 42 will do so for chrominance signals at a phase lagging the reference phase by approximately 60° because of 60° lead network 40. Further, all signals detected by the red and yellow gates will tend to be shifted by the gate outputs toward a phase midway between the axes of demodulation or detection of the red and yellow gates.

It is thus apparent that by altering the phase shift of network 46, the viewer may easily adjust the detection axes of gates 42 and 44 and thus the phasic location of the range of hues which will be altered toward the central, critical hue. This adjustment simultaneously alters the location of the critical hue toward which other hues will be shifted.

It will be obvious that many modifications of the specific embodiment shown may be made without departing from the spirit and scope of this invention. For example, different circuitry may be used for providing the desired phase shift. Different variable elements may be used to adjust the phase shift. It will also be apparent that this invention will find application in many hue modification circuits of other types than the one disclosed herein.

It will thus be seen that a preference control has been provided for use with color television chrominance signal modification circuits allowing one to easily adjust the nature of the induced modification and, more particularly, that a preference control has been provided for use with color television hue expander circuits allowing the viewer to easily adjust the critical hue toward which colors having a hue near it are shifted. While a particular embodiment of this invention is shown above, it will be understood, of course, that the invention is not to be limited thereto since many modifications may be made. It is contemplated, therefore, by the appended claims to cover such modifications as fall within the true spirit and scope of this invention.

I claim:

1. An information processing system comprising an information signal source, a reference signal source, information recovery means for recovering the information by comparing a parameter of said information signal and at least one parameter of said reference signal, and an information altering circuit coupled to said information signal source and said reference signal source for detecting a signal representative of a relationship between said information signal and said reference signal and effectively altering the information content of said information signal within a predetermined range of said information signal parameter in accord with said signal before it is applied to said information recovery means, said information altering circuit including variable circuit means for manually adjusting said one parameter of said reference signal.

2. A color television system comprising a chrominance signal source, a reference signal source, and a hue altering circuit for detecting a parameter representative of a relationship between said chrominance signal and said reference signal and effectively altering the hue represented by said chrominance signal in accord with said parameter to enhance flesh tones, said hue altering circuit including a variable phase shift means having a viewer-operated variable circuit means for adjusting the phase of said reference signal before said parameter is detected.

3. Color television apparatus comprising:

chrominance channel means for supplying a chrominance signal-bearing information in the form of sideband components of a wave at a fixed frequency;

reference signal means for supplying a reference signal at said fixed frequency and a nominally predetermined phase;

hue-altering circuit means coupled to said chrominance channel means and said reference signal means for electrically detecting a phase relationship between said chrominance signal and said reference signal and altering the relative phase of said chrominance signal and said reference signal in accord with said detected relationship to enhance flesh tones; and manually operated variable circuit means for adjusting the phase of the reference signal applied to said hue altering circuit.

4. An apparatus for modifying a delivered electrical signal having a parameter representative of information and variable over a wide range of useful values, said apparatus comprising means for generating a reference signal having said parameter at a predetermined value, detection circuit means coupled to said generating means for determining when said parameter of said delivered signal is within a predetermined range narrower than said wide range and related to said predetermined value, and correction means coupled to said detection means for altering only those positions of said delivered signal having said delivered signal parameter within said predetermined range to form a modified delivered signal, said generating means including a manually variable element to adjust said predetermined value of said parameter of said reference signal.

5. A color television receiver having a hue-altering apparatus for detecting when the phase of a received chrominance signal is within a predetermined phase range of a reference signal and modifying the phase of said chrominance signal when the phase of said received chrominance signal is within said predetermined range to enhance flesh tones and a reference signal generating means, said reference signal generating means including a manually variable element to adjust the phase of said reference signal.

6. Hue-altering apparatus for a color television system comprising:

chrominance channel means for supplying a chrominance signal;

reference signal generator means for generating a reference signal at a predetermined phase;

control means for manually varying said predetermined phase;

detector means coupled to said chrominance channel means and said reference signal generator means for detecting when the phase of said chrominance signal is within a predetermined phase range;

corrector means coupled to said detector means and said chrominance channel receiving means for generating a correction signal and combining said correction signal and said chrominance signal to form a corrected chrominance signal having altered hue characteristics; and demodulator means for demodulating said corrected signals.

7. The apparatus of claim 6 wherein said predetermined phasic range is centered about a phase corresponding to a hue representative of flesh.

8. Hue-altering apparatus for a color television receiver comprising:

reference signal generating means for generating a reference signal at a predetermined phase;

first-phase shift means coupled to the output of said reference signal generating means for altering the phase of said reference signal;

control means for conveniently varying the phase alteration of said first phase shift means;

chrominance channel receiving means for supplying a received chrominance signal;

first gate means coupled to said chrominance channel receiving means and first-phase shift means for determining when the signals applied to it are in a predetermined phasic relationship;

second phase shift means coupled to the output of said first gate means for phase shifting the output signal from said first gate means;

third-phase shift means coupled to said chrominance channel receiving means for phase shifting said received chrominance signal;

second gate means coupled to said first phase shift means and said third phase shift means for determining when the signals applied to it are in a predetermined phasic relationship;

fourth phase shift means coupled to the output of said second gate means for phase shifting the output signal from said second gate means; and summer means coupled to said second-phase shift means, said fourth-phase shift means, and said chrominance channel receiver for combining the signals applied to it.

9. The apparatus of claim 8 wherein said control means comprises a variable impedance element included within said first phase shift means.

10. The apparatus of claim 9 wherein said variable impedance element is a variable resistance.

* * * * *

UNITED STATES PATENT OFFICE
CERTIFICATE OF CORRECTION

Patent No. 3,649,746 Dated March 14, 1972

Inventor(s) Paul E. Knauer and John M. Kresock

It is certified that error appears in the above-identified patent and that said Letters Patent are hereby corrected as shown below:

Column 2, line 11 - "viewer-operated" should not be hyphenated.

Column 2, line 53 - "radiofrequency" should be "radio frequency" (two words).

Column 2, line 56 - "amplitude-modulated" should not be hyphenated.

Column 3, line 39 - "I-phase" should not be hyphenated.

Column 4, line 32 - "single-pole-triple-throw" should not be hyphenated.

Claim 1, line 40 - Insert "detected" between "said" and "signal".

Claim 2, line 53 - "viewer-operated" should not be hyphenated.

Claim 3, line 58 - "signal-bearing" should not be hyphenated.

Claim 4, line 7 - "only those positions" should be "only those portions".

Claim 5, line 12 - "hue-altering" should not be hyphenated.

Claim 6, line 21 - "Hue-altering" should not be hyphenated.

Claim 8, line 45 - "Hue-altering" should not be hyphenated.

Claim 8, line 49 - "first-phase" should not be hyphenated.

Claim 8, line 57 - "first-phase" should not be hyphenated.

(cont'd.)

UNITED STATES PATENT OFFICE

CERTIFICATE OF CORRECTION

Patent No. 3,649,746 Dated March 14, 1972

Inventor(s) Paul E. Knauer and John M. Kresock

It is certified that error appears in the above-identified patent and that said Letters Patent are hereby corrected as shown below:

Claim 8, line 63 - "third-phase" should not be hyphenated.

Claim 8, line 74 - "fourth-phase" should not be hyphenated.

Assistant Examiner is Pecori, not Pecort as noted on the title page.

Signed and sealed this 5th day of September 1972.

(SEAL)
Attest:

EDWARD M.FLETCHER,JR.
Attesting Officer

ROBERT GOTTSCHALK
Commissioner of Patents

FORM PO-1050 (10-69)
USCOMM-DC 60376-P6
★ U.S. GOVERNMENT PRINTING OFFICE : 1969 O—366-3